United States Patent [19]

Nordström

[11] Patent Number: 5,046,690
[45] Date of Patent: Sep. 10, 1991

[54] DEVICE FOR MOVING GOODS IN THE CARGO SPACE OF AN AIRCRAFT

[76] Inventor: Claes Nordström, John Lundvallsgatan 66, S-230 44 Vintrie, Sweden

[21] Appl. No.: 166,963

[22] PCT Filed: Oct. 13, 1986

[86] PCT No.: PCT/SE86/00469
§ 371 Date: Mar. 8, 1988
§ 102(e) Date: Mar. 8, 1988

[87] PCT Pub. No.: WO87/03857
PCT Pub. Date: Jul. 2, 1987

[30] Foreign Application Priority Data
Oct. 23, 1985 [SE] Sweden ................. 8506108

[51] Int. Cl.⁵ .................................. B64D 9/00
[52] U.S. Cl. ............................. 244/137.1; 198/250; 198/841; 414/527; 414/515
[58] Field of Search .................. 244/137.1, 118.1; 414/527, 528, 510, 514, 515, 521, 529.1; 198/750, 496, 827, 840

[56] References Cited

U.S. PATENT DOCUMENTS

| | | | |
|---|---|---|---|
| 2,372,475 | 3/1945 | Doberstein | 414/528 |
| 3,448,876 | 6/1969 | Mosman et al. | 414/528 |
| 3,481,647 | 12/1969 | Cook | 414/528 |
| 3,798,304 | 3/1974 | Poundstone | 198/750 |
| 3,998,343 | 12/1976 | Fors | 414/527 |
| 4,162,735 | 7/1979 | Lewis | 414/514 |
| 4,216,927 | 8/1980 | Byrd | 244/118.1 |
| 4,848,539 | 7/1989 | Allwein | 198/841 |
| 4,984,756 | 1/1991 | Anders | 244/137.1 |

FOREIGN PATENT DOCUMENTS

| | | | |
|---|---|---|---|
| 3615927A1 | 11/1987 | Fed. Rep. of Germany . | |
| 519308 | 3/1955 | Italy | 414/528 |
| 0941257 | 7/1982 | U.S.S.R. | 198/750 |
| 87/00246 | 11/1987 | World Int. Prop. O. . | |

OTHER PUBLICATIONS

Swedish Application 8506108, copy of decisions, 6/23/87.
Speednews, Jun. 1, 1984, drawings pp. 2-5, Swedish Application 8506108.
Decision of allowance, Swedish Application 8506108, 11/3/89.
Conference Proceedings of the Twelfth International forum for Air Cargo, P-149.
12th International Forum for Air Cargo, May 21, 1984.
Asian Aviation, Jun. 1985, Figure of Fokker's Moving Belt Loading System.
Trimvlak, Sep. 20, 1985, article about conveyor belt system. Enlarged picture of conveyor belt system.
Summons application, Jul. 29, 1988.
Swedish Design application 87-04747, 2/19/88.
PCT Gazette, No. 11/1989, p. 2665.

Primary Examiner—Galen Barefoot
Attorney, Agent, or Firm—Birch, Stewart, Kolasch & Birch

[57] ABSTRACT

A device for loading and unloading goods in an aircraft is provided in the cargo space (1) of the aircraft. The device has at least one transport path (3; 3A, 3B) which is substantially parallel to the floor of the cargo space (1) and on which the goods is placed; a drive assembly (11, 13–19, 13', 17'; 40–47) by means of which the transport path (3; 3A, 3B) can be driven forwards and backwards; and a wall (10) which extends vertically transversely of the cargo space, serves as a stop for the load piled on the belt and is connected to the transport path and movable together with it from a position adjacent the opening of the cargo space through which the goods is loaded and unloaded, to a position at the far end (1A) of the cargo space, and vice versa. The transport path comprises a mat structure (5) which is adapted to rest directly on the floor of the cargo space, such that the weight of the goods placed on the transport path is supported by the floor of the cargo space, both during displacement of the goods in the cargo space and during flight. The device may also comprise two side transport paths (3B) which are driven in synchronism with said first transport path.

10 Claims, 6 Drawing Sheets

DEVICE FOR MOVING GOODS IN THE CARGO SPACE OF AN AIRCRAFT

The present invention relates to a device for moving goods in the cargo space of an aircraft, comprising a transport path which is substantially parallel to the floor of the cargo space and on which the goods is to be placed, and a drive assembly for driving the transport path forwards and backwards.

Many transports in and between different countries are today carried out by air, which means that substantial quantities of goods and luggage are loaded and unloaded every day from the cargo spaces of aircraft. In large aircraft, such as jumbo jets and DC 10s, this is no major problem since these have large cargo spaces and the goods can be loaded and unloaded from the aircraft by means of roller conveyors. In smaller aircraft typically having cargo spaces of a length of about 3–5 m and a height of about 1 m, loading and unloading of goods is a problem to which no satisfactory solution has yet been suggested. In these types of aircraft, loading is carried out manually in that the personnel climb into the cargo space and receive the goods through the entrance opening and move it into the cargo space where it is piled up. This is most unsatisfactory from working environment aspects. The working space is confined, work is heavy and involves turning and twisting of the body. When the weather is cold, the loading personnel will have to choose a suitable outfit, bearing in mind that heavy clothes are embarrassing when loading and unloading. Further, this loading technique is time- and labour-consuming.

Thus, it would be desirable to have access to a mechanical device capable of carrying out this heavy work and of shortening the time required for the loading operations. Such a device is however difficult to design since there are many requirements and regulations to be complied with. For instance, the device must not be heavy, because each additional kilo will raise fuel costs, but yet should be so stable and sturdy that it can handle heavy goods, such as newspapers. Further, the walls and the floor of the cargo space should be easily accessible for inspection. Finally, it is also of importance that the device be so designed that the goods cannot slip underneath or beside the device and make a hole in the floor or the walls.

For transporting goods on trucks, it is known from U.S. Pat. specification No. 4,345,869 to use a technique for moving the goods in the cargo space of the truck which involves a conventional motor-powered endless conveyor which is arranged in a recess in the floor of the cargo space and the length of which can be shortened and extended by means of flaps that can be folded over or removed from the conveyor. During transport, the goods is piled on that part of the floor of the cargo space which is not occupied by the conveyor and on the flaps folded over the conveyor During transport, the conveyor is thus not supporting any cargo.

This technique is however not applicable to aircraft since it is not possible to mount a conveyor in a recess in the floor of the aircraft fuselage and since a conventional conveyor is far too heavy to comply with current weight specifications for airline transports.

The object of the present invention thus is to provide a device for moving goods in the cargo space of an aircraft, which improves the working environment for the personnel charged with the loading and unloading of goods, and which shortens the time required for the loading and unloading operations while fully complying with all requirements and safety regulations on aircraft equipment. According to the invention, this object is achieved by means of a device of the type stated in the introduction to this specification, which is characterized in that it comprises a wall extending vertically transversely of the cargo space and serving as a stop for the goods placed on the transport path, said wall being connected to the transport path and movable together therewith between one end position adjacent the opening of the cargo space through which the goods is loaded and unloaded, and another end position at a far end of the cargo space; and that the transport path comprises a mat structure adapted to rest directly on the floor of the cargo space, such that the weight of the goods placed on the transport path is supported by the floor of the cargo space, both during displacement of the goods in the cargo space and during flight.

A device of the type described above eliminates the cumbersome working operation which, in connection with loading, consists in that the loading personnel crawl into the cargo space with the goods and pile it up and which, in connection with unloading, consists in that the loading personnel crawl into the cargo space and pull the goods up to the opening in the aircraft fuselage. With a device according to the present invention, the goods need only be piled up against the wall or against goods previously loaded. The displacement of the goods to the far end of the cargo space is thereafter carried out with the aid of the transport path while, for the purpose of unloading, the goods is moved by means of the transport path up to the opening in the aircraft fuselage. Moreover, the device is lightweight and space-saving so that almost the entire cargo space can be used for storing the goods. Finally, the device cuts loading times.

The present invention will now be described in greater detail hereinbelow in some embodiments, with reference to the accompanying drawings.

As mentioned above, a device according to the present invention is intended to be placed in the cargo space 1 of an aircraft. The cargo space 1 has a far end 1A and a front end 1B adjacent an opening (not shown) through which the goods is loaded and unloaded. If this opening is located in the middle of the long side of the cargo space instead of the end thereof, two loading devices are required, one for each half of the cargo space. The floor 2 of the cargo space has a horizontal central portion 2A and two arcuate side portions 2B which are slightly slanting towards the central portion.

Figure 1:
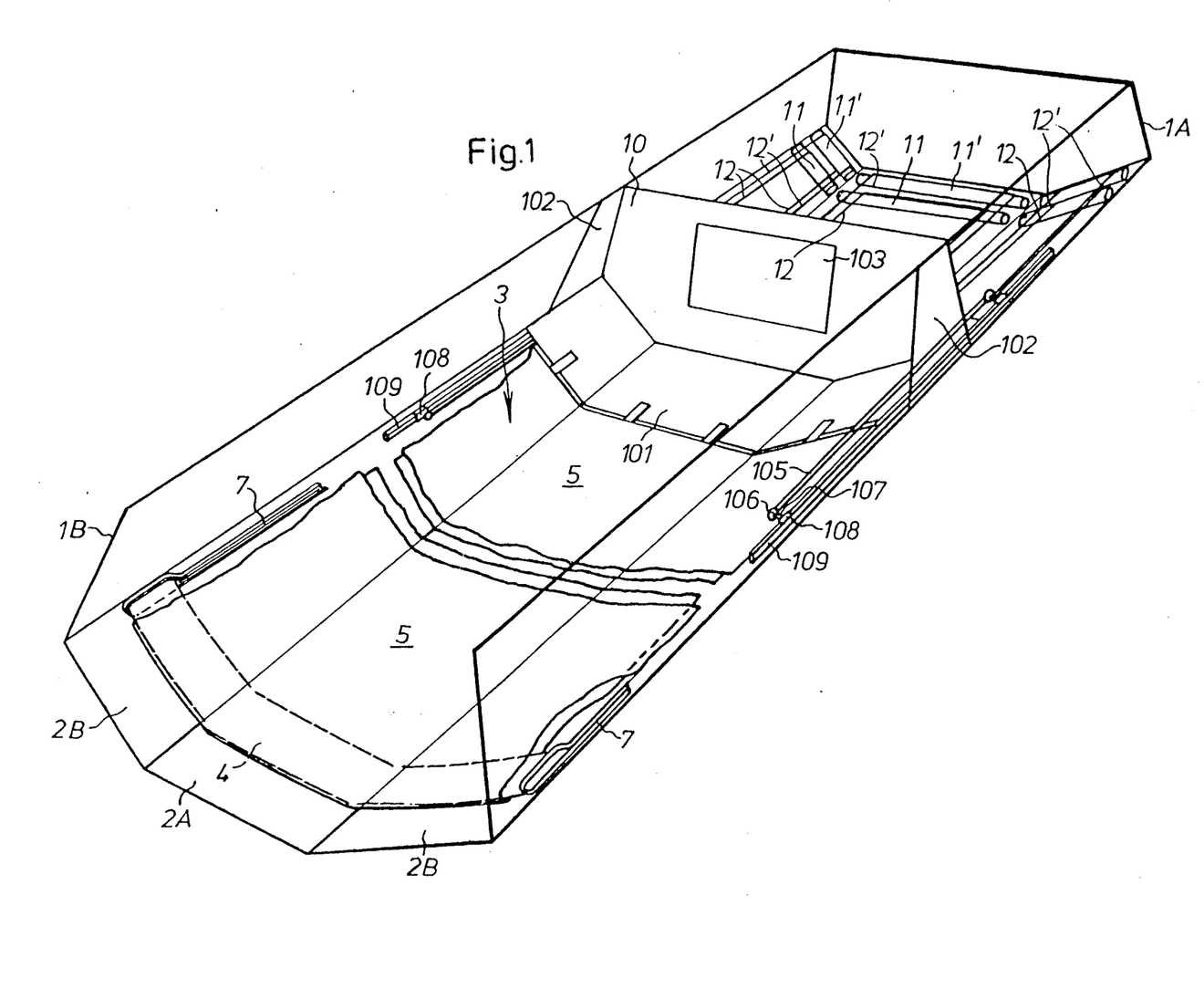
FIG. 1 is a perspective view of a first embodiment of the device mounted in an aircraft fuselage.
Figure 2:
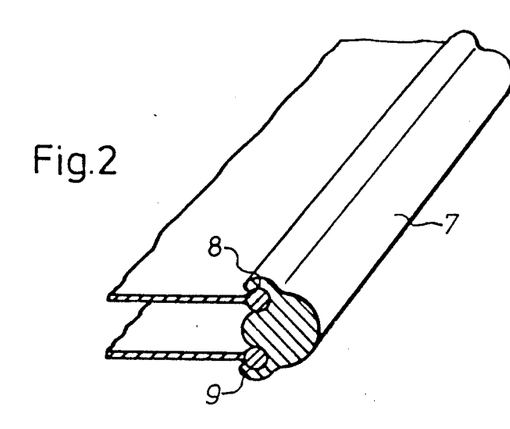
FIG. 2 is a cross-sectional view of a guide rail included in the device of FIG. 1.

The loading device extends in the longitudinal direction of the cargo space 1 and comprises, in a first embodiment shown in FIG. 1, a transport path 3 extending substantially parallel to the floor of the cargo space and running over guide members 4 which are arranged at the front end 1B of the cargo space and which in the illustrated embodiment consist of a guide plate extending across the entire width of the cargo space. The transport path 3 comprises a flexible webbing or mat 5, the length of which is at least equal to the length of the part of the cargo space used for storing goods and the width of which is substantially equal to the total width of the floor portions 2A, 2B, and narrow straps 12 which are fixed in the mat. The straps may either be fixed in each end of the mat or extend throughout the entire length of the mat, such that the ends of the same strap will extend from each end of the mat. In order that the mat should withstand heavy loads, it should consist of wear-resistant material. One example of a suitable material is a woven aramid fabric. The long sides of the mat run in guide rails 7 fixed to the lateral edges of the floor. FIG. 2 shows an example of how such a guide rail 7 may be designed in the middle of the cargo space. In this instance, the guide rail is an aluminium section having an upper and a lower groove 8 and 9, respectively. The upper part of the mat runs in the upper groove 8 and the lower part of the mat in the lower groove 9. At the guide member 4, the upper groove 8 of the guide rail extends around the guide member and, at the underside thereof, joins the lower groove 9. The guide rails prevent the mat from sliding down and loose objects from slipping in underneath the mat.

Figure 3:
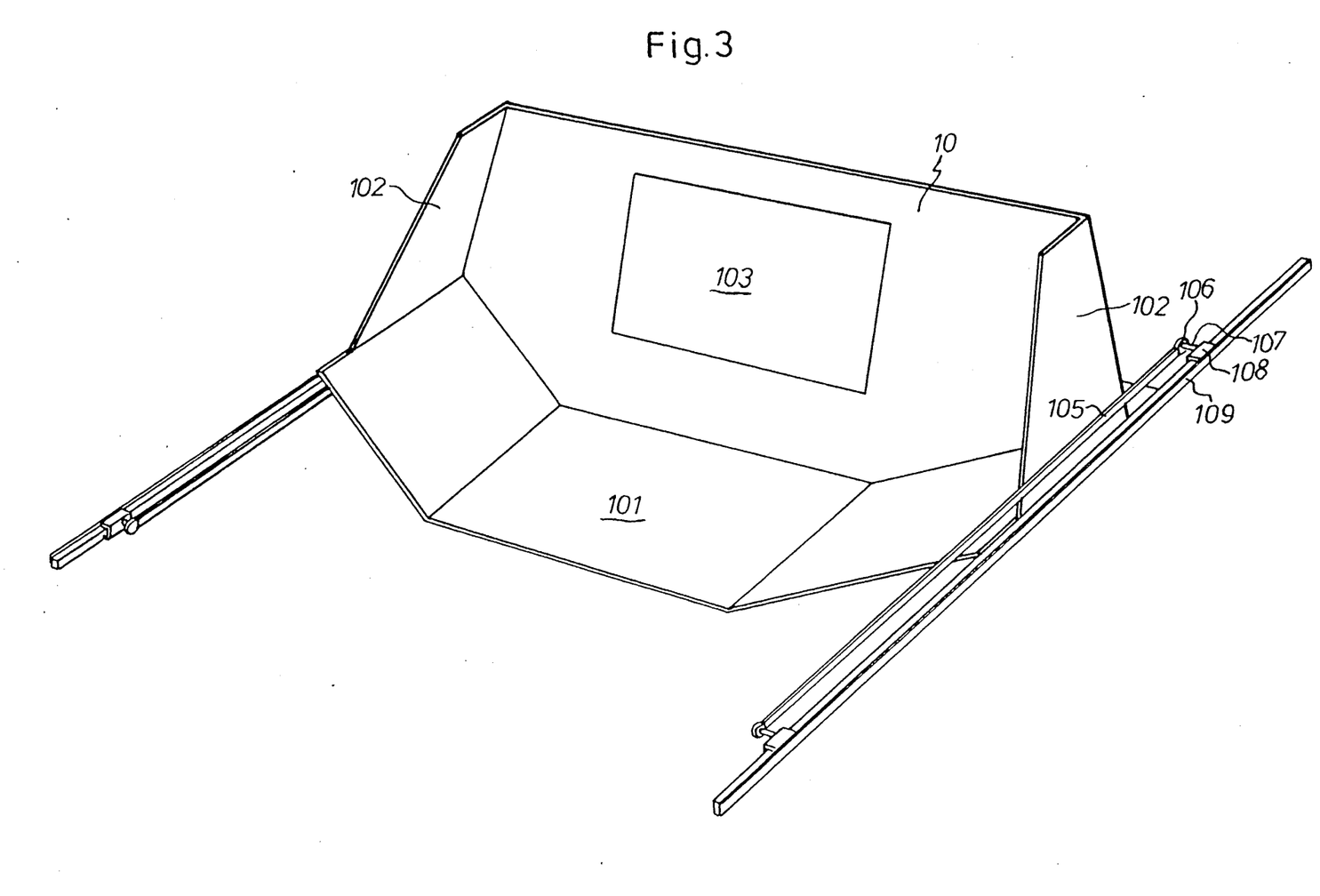
FIG. 3 is a perspective view of a movable wall included in the device of FIG. 1.

The device further has a wall 10 with a vertical part which extends transversely of the longitudinal direction of the transport path and the shape of which is conformed to the cross-section of the cargo space. The construction of the wall 10 is shown in more detail in FIG. 3. It appears from this figure that the wall 10 may also have a horizontal part 101, the shape of which is conformed to the floor of the cargo space, and two side members 102. In the vertical part of the wall, there is a door 103 allowing access to the means which are disposed behind the wall at the far end 1A of the cargo space and which will be described in more detail hereinbelow. The wall 10 is connected to the mat 5 by means of straps and, hence, will accompany the mat when being moved. One problem that may arise during the movement of the wall together with the mat is that the wall may come askew in the cargo space and jam. To overcome this problem, the wall is provided with guide means. These guide means comprise a tube 105 fixed on each side of the wall. Each tube extends parallel to the longitudinal direction of the transport path and a joint head 106 is screwed in each end of the tubes. One joint head has a left-hand thread and the other a right-hand thread, which means that the two joint heads are tightened or loosened when the tube is rotated in one direction. Through the joint heads 106, there is mounted a threaded rod 107 which is screwed in a carriage 108 which in turn is sliding on a rail 109 extending along the wall of the cargo space. This arrangement thus ensures that the wall 10 will not come askew during its displacement in the cargo space. Further, said guide means ensure that the wall will not tilt upon acceleration or deceleration.

Figure 4:
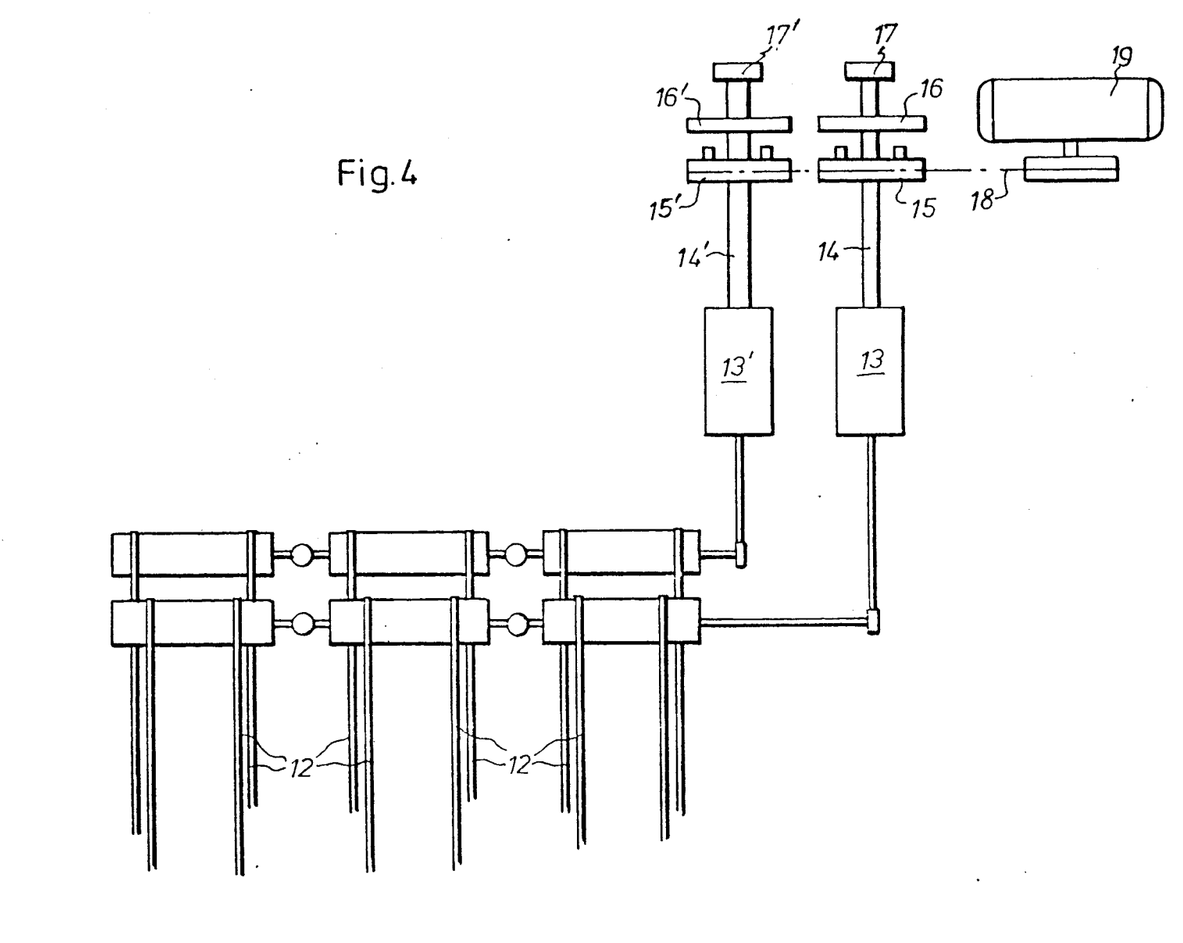
FIG. 4 is a schematic view of the drive assembly for the device according to the invention.

As mentioned above, the transport path 3 is movable backwards and forwards in the longitudinal direction of the cargo space 1 in such a manner that the wall 10 can be moved from one end position adjacent the far end 1A of the cargo space to another end position adjacent the front end 1B of the cargo space, and vice versa. Naturally, the wall can be stopped at any point between these two end positions. The transport paths are moved by means of a drive assembly comprising wind-up and pay-out means 11, 11', here consisting of rollers, and a motor (not shown in FIG. 1) which, together with the rollers 11, 11', is arranged at the far end 1A of the cargo space so as to be out of the way during loading. FIG. 4 schematically shows the drive assembly and the straps 12, 12' connecting the rollers to the webbing or mat. As appears from this figure, the drive assembly comprises three front rollers 11 and three rear rollers 11', the outer rollers being arranged at an angle to the central rollers so as to be substantially parallel to the side portions of the floor. The front rollers 11 are connected to one end of the mat 5 by means of straps 12 and the rear rollers 11' are similarly connected to the other end of the mat 5 by means of straps 12'. Further, the front rollers 11 and the rear rollers 11', are each connected to one another by means of shafts and joints and connected to a planetary gear 13 and 13', respectively. On the output shafts 14 and 14' of the planetary gears, gears 15 and 15', respectively, are mounted. The output shafts 14 and 14' also carry an electromagnetic coupling 16 and 16', respectively, and a brake 17 and 17', respectively. The gears are connected to a motor 19 by means of a toothed transport path 18.

When the transport path 3 is to be moved, the motor 19 is started, the gear 15' is engaged with the coupling 16' for movement in the forward direction (in connection with unloading), and the other gear 15 is engaged with the other coupling 16 for movement in the rearward direction (in connection with loading), and the rollers 11' and 11 are caused to rotate. During unloading, the straps 12' are wound on the rollers 11' while the straps 12 are unwound from the rollers 11, and vice versa during loading.

It should also be noted that the device is suitably controlled from a control panel at the opening of the cargo space and that limit switches and emergency stops should be provided at the front and rear ends of the cargo space.

When the loading device should be blocked, one set of rollers 11; 11' is locked by means of the associated brake 17, 17'. The motor 19 is thereafter pulsecontrolled, and the other set of rollers 11'; 11 is caused to rotate until the straps and the mat are stretched, whereupon this set of rollers is also locked by means of its brake 17', 17.

An important demand placed on devices of this type is, as mentioned above, the necessity of allowing convenient inspection of the floor, walls and ceiling of the cargo space. To allow inspection of a cargo space where the device according to the present invention is installed, the transport path is first moved such that the wall 10 is located in the rear end position 1A. The mat can then be lifted at the front end 1B by means of loops attached to the mat, thus making it possible to inspect the front half of the cargo space. The transport path is thereafter moved to a position where the wall 10 is located in the middle of the cargo space. The distal half of the floor of the cargo space is then covered only by the narrow straps 12. 12' connected to the rollers 11, 11', and can be inspected through the door in the wall.

Alternatively, the connections of the wall 10 to the guides provided on the walls of the cargo space may be loosened, whereupon the entire mat can be lifted and the entire floor inspected.

Finally, it should be mentioned that it may be advantageous to coat the floor 2 of the cargo space with a woven fabric of Teflon ® (not shown) in order to cover any unevennesses in the floor and to facilitate sliding.

Optionally, it may also be advantageous to fix a sliding cloth in a third groove (not shown) in the guide rail 7 between the grooves 8 and 9. Such a cloth reduces the friction between the upper and lower parts of the mat.

The operation of the device will now be described in more detail. When goods should be loaded in the cargo space, the wall 10 is first moved up to its end position adjacent the front end 1B. The goods is moved up to the opening of the cargo space and placed in the cargo space, stacked against the wall on the mat 5. When the space in front of the wall has been filled to the desired height, the wall is moved a suitable distance inwardly in the cargo space 1 and additional goods is loaded on the newly appearing part of the mat. This operation is repeated until the cargo space is filled or until all the goods has been loaded. Unloading is carried out in a similar way. Thus, the goods nearest the opening is removed from the cargo space and the mat 5 and the wall 10 are thereafter moved in a direction towards the front end 1B, such that further goods is available at the opening. By means of this device, it is possible to eliminate many of the heavy working operations required for loading and unloading goods from cargo spaces, this considerably improving the working conditions of the personnel. In this context, it should also be pointed out that the weight of the goods is supported on the mat by the floor in the cargo space, both during shifting of the goods in connection with loading and during flight. Thus, the loading device has no load-bearing structure of its own.

Figure 5:
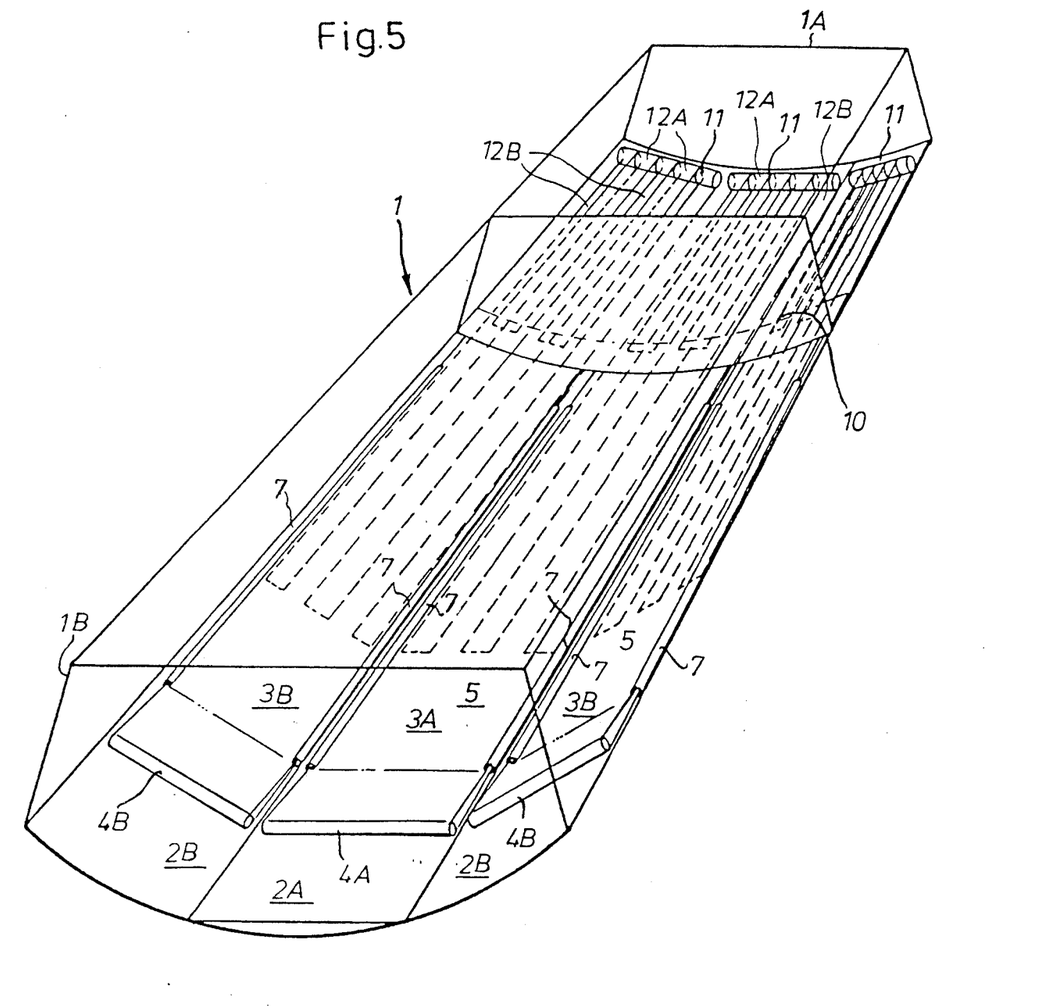
FIG. 5 is a perspective view showing a second embodiment of the device according to the invention.

FIG. 5 illustrates a second embodiment of the device according to the present invention This figure shows many of the components illustrated in FIG. 1 and the same reference numerals are used for these components. As appears from FIG. 5, the loading device of this embodiment comprises three transport paths 3A, 3B of which the transport path 3A extends along the central portion 2A of the floor and the other two transport paths 3B extend along the side portions 2B of the floor. As in the first embodiment, each transport path comprises a flexible webbing or mat 5 whose length is equal to the length of the part of the cargo space used for storing goods and whose width is approximately equal to the width of the corresponding floor portion, and wide straps 12A, 12B attached to the mat. Further, each transport path 3A, 3B passes around a guide roller 4A and 4B, respectively, arranged at the front end 1B of the cargo space, the guide roller 4A pertaining to the central transport path 3A consisting of a single roller while the guide rollers 4B pertaining to the side transport paths 3B suitably consist of three rollers articulated to each other to obtain improved stretching of the side transport paths. As in the first embodiment, the transport paths 3A, 3B are suspended along their long sides from guide rails 7 which, in this embodiment, do not however extend as far as the guide rollers. The device further comprises a wall 10 which extends transversely of the longitudinal direction of the transport paths 3A, 3B and which can be folded to allow access to the components disposed behind it. As earlier, the transport paths 3A, 3B are movable forwards and backwards in the longitudinal direction of the cargo space 1 such that the wall 10 is moved from its end position adjacent the far end 1A of the cargo space to its end position adjacent the front end 1B of the cargo space, and vice versa. The transport paths are moved by means of a ⌄rive assembly which is arranged in the far end of the cargo space and which in this embodiment comprises only one roller 11 for each transport path and motors (not shown) driving the transport paths synchronously. In order to save space, the motors are suitably arranged within the driving rollers 11. The transport paths 3A, 3B are connected to the driving rollers 11 by means of the wide straps 12A, 12B which are attached both to the webbing or mat of the transport paths and to the driving rollers.

Figure 6:
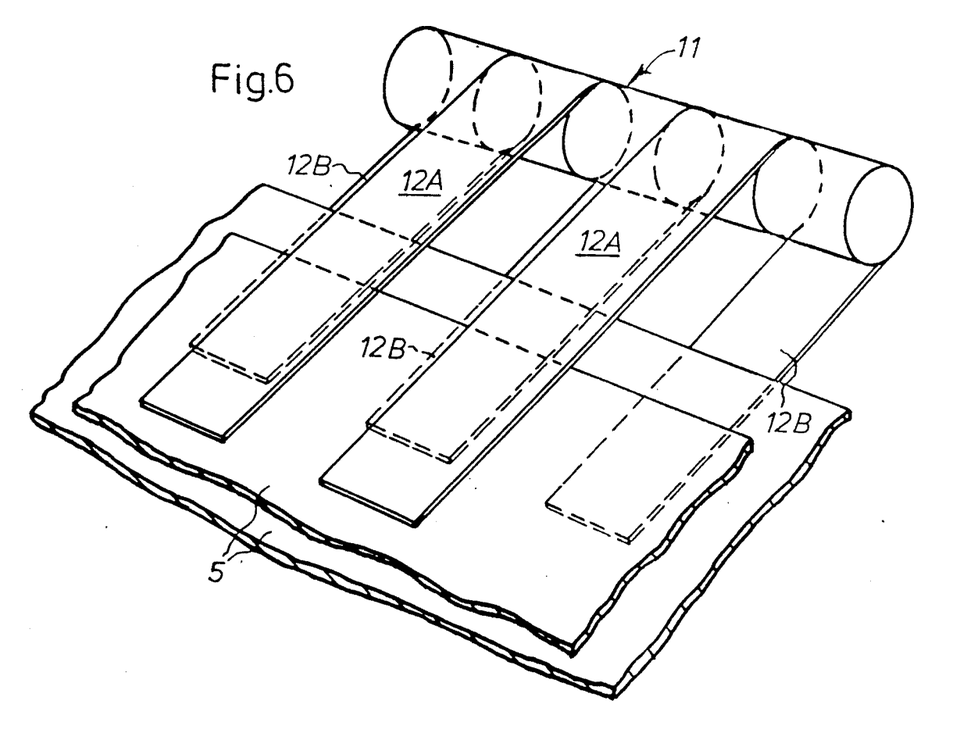
FIG. 6 shows part of the drive assembly in the second embodiment of the invention.

One example of how these transport paths may be arranged is shown in FIG. 6. Two upper straps 12A are attached at one end to the upper part of the associated mat and at their other ends to the roller 11 on the upper side of which they run. The other three straps 12B are similarly attached at one end to the lower part of the associated mat and at their other ends to the roller 11 on the lower side of which they run during winding and unwinding. When the roller is driven in the direction of the arrow, the straps 12A will thus be unwound from the roller, the upper part of the mat and the wall 10 will move towards the front end 1B, the lower part of the mat will move towards the rear end 1A, and the lower straps 12B will be wound on the rollers 11. Similarly, when the roller 11 is driven in a direction contrary to that of the arrow, the upper straps 12A will be wound on the roller and the lower straps 12B unwound therefrom.

The operation of the device is exactly the same as in the first embodiment and, therefore, need not be further described.

Figure 7:
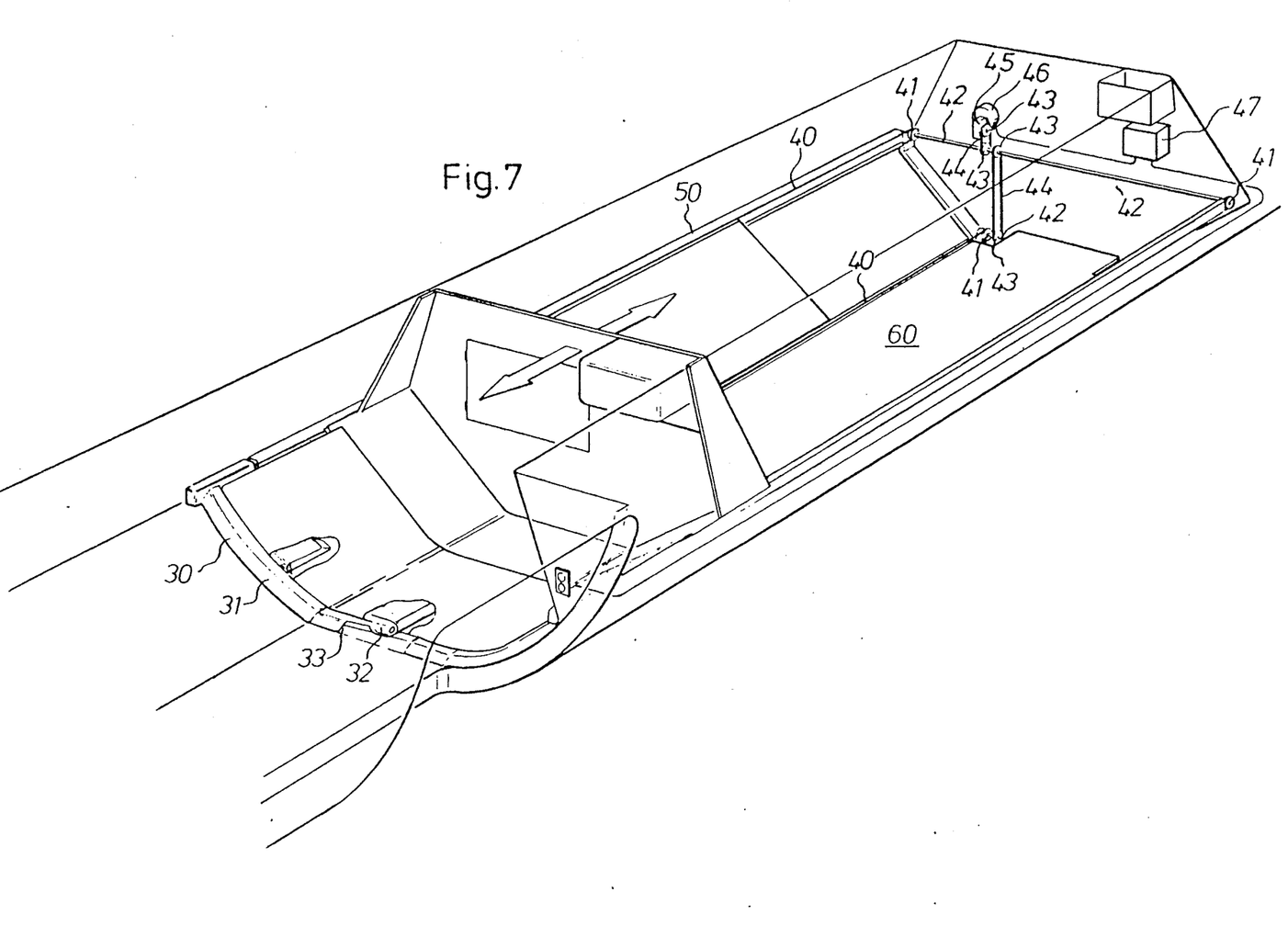
FIG. 7 is a perspective view with certain parts broken away, showing a third embodiment of the invention.

A third embodiment of the invention is shown in FIG. 7 in which parts corresponding to parts previously described have been given the same reference numerals and will not be described hereinafter. The embodiment shown in FIG. 7 differs from the two embodiments described above primarily in respect of the driving of the transport path, but also the design of the front end of the cargo space as well as the lateral guides for the transport path and the wall are slightly different.

The construction at the front end of the cargo space comprises a freely hanging wing 30 which is fixed in the side walls of the cargo space The wing 30 has a protective strip 31 serving to protect the transport path during loading and unloading of goods. Guide rollers 32, around which the mat 5 runs, are fixed at the front edge of the wing. Preferably, there is one roller for each of the floor portions 2A and 2B. The wing 30 is further provided with brushes 33 which are spring-loaded against the mat and serve to remove dirt or litter therefrom so that no loose objects can slip in underneath the device and cause damage.

The device according to this embodiment of the invention further comprises a slide plane 60 which at the front end is fixed to the wing 30 and which is otherwise supported at the far end 1A of the cargo space, such that, when in the unloaded state, it is supported clear of the floor at a small distance therefrom. The mat 5 runs on the upper side of the slide plane 60, passes over the guide rollers 32 and returns at the underside of the slide plane between this and the floor. The slide plane 60 serves to reduce the friction between the upper and the lower part of the mat 5. When the goods is placed on the transport path, the slide plane 60 will sag and, as in the embodiments described above, the weight of the goods will be taken up by the floor. The mat structure consisting of the slide plane 60 and the mat 5 thus has no supporting capacity. Thus, the arrangement is resting directly on the floor, so that the weight of the goods placed on the belt is supported by the floor in the cargo space, both during displacement of the goods in the cargo space and during flight.

In this embodiment of the invention, the transport path 3 is driven by a chain drive. Endless chains 40 are provided at both long sides of the transport path 3 and also along the two lines of intersection between the horizontal portions 2A and inclined portions 2B of the floor. The chains 40 are provided with flanges, preferably riveted to the mat 5. The chains run along said two lines of intersection in guides (not shown) which in the same manner as the slide plane 60 are fixed in the wing 30 and at the far end 1A of the cargo space. At the underside of the guides, there may be provided rollers which take up the stresses exerted on the guides when goods are placed on the transport path. On each long side of the cargo space, the transport path 5 and the chain 40 fixed at the respective side thereof run in a section 50 holding the chain in place and guiding it. Also the wall 10 runs at its sides in the section 50. In the far end 1A of the cargo space, the chains pass around toothed wheels 41 which by conventional shafts 42, toothed wheels 43, toothed transport paths 44 and a coupling 45 are driven by a motor 46 which is powered from a power source 47. Many different variants of the mode of driving the chains 40 are possible within the scope of the invention.

This embodiment of the invention operates in exactly the same way as the embodiments described above and, thus, the operation need not be further described here.

It goes without saying that the present invention may be modified in many different ways within the spirit and scope of the accompanying claims. Hence, the device is not restricted to the embodiments described above, but combinations thereof and modifications are possible without departing from the inventive principle. For instance, the guide means may be replaced by a driven roller on which the mat is wound when the transport path is driven so as to move the wall in a direction towards the opening, and from which the mat is paid out when the transport path is driven in the opposite direction. In a further alternative, the guide means can be replaced by other means in which the mat is collected, for instance in a folded state, when the transport path is moving towards the opening, and from which the mat, as earlier, is paid out when the transport path moves in the opposite direction.

I claim:

1. Device for moving goods in the cargo space (1) of an aircraft, comprising at least one transport path (3; 3A, 3B) which is substantially parallel to the floor of the cargo space (1) and on which the goods is to be placed, and a drive assembly (11, 13-19, 13'-17'; 40-47) for driving said transport path backwards and forwards, characterized in that the transport path comprises a mat (5) and has a lower run arranged to rest directly on the floor of the cargo space (1), and an upper run arranged to rest over the lower run in such a manner that the weight of the goods placed on the transport path is supported via said runs by the floor of the cargo space, both during displacement of goods in the cargo space and during flight.

2. Device as claimed in claim 1, characterized by a guide plate (4) which is substantially parallel to the floor of the cargo space and disposed at one end of said transport path and over which said transport path is arranged to run.

3. Device as claimed in claim 1 or 2, characterized by friction-reducing means (60) provided between the upper run and the lower run of the transport path.

4. Device as claimed in claim 3, characterized in that the friction-reducing means comprise a slide plane (60) which is fixed at the front and rear ends (1B and 1A, respectively) of the transport path, such that, when in the unloaded state, it extends parallel to the floor of the cargo space at a small distance therefrom.

5. Device as claimed in claim 1, characterized by a wall (10) extending vertically transversely of the cargo space and serving as a stop for the goods placed on the transport path, said wall being connected to the transport path and movable together therewith between one end position (1B) adjacent the opening of the cargo space through which the goods is loaded and unloaded, and another end position at a far end (1A) of the cargo space.

6. Device as claimed in claim 1 characterized by guides (7; 50) which extend along the long sides of each transport path (3; 3A, 3B) and in which the lateral edges of the transport path run.

7. Device as claimed in claim 1 characterized in that the wall is connected to means (108) which are displaceable on or in rails (109) provided on the side walls of the cargo space for guiding said wall.

8. Device as claimed in claim 1 characterized in that the mat structure comprises a flexible webbing or mat (5) and friction-reducing means (60) provided between the upper and the lower part of the mat (5).

9. Device as claimed in claim 1 characterized in that the friction-reducing means comprise a slide plane (60) which is fixed at the front and rear ends (1B and 1A, respectively) of the transport path, such that, when in the unloaded state, it extends parallel to the floor of the cargo space at a small distance therefrom.

10. Device as claimed in claim 1 characterized in that the length of the mat (5) is at least equal to the distance from the opening in the cargo space to the far end position (1A) of the wall.

* * * * *